United States Patent [19]

N'Guyen Duc et al.

[11] 4,413,844
[45] Nov. 8, 1983

[54] SWIVEL CONNECTOR BETWEEN A FLOATING OR SEMI-SUBMERGED STRUCTURE AND A RISER OR FLOW LINE

[75] Inventors: Xuong N'Guyen Duc, Rueil Malmaison; Rene Szabo, Le Pecq, both of France

[73] Assignee: Coflexip, Rueil Malmaison, France

[21] Appl. No.: 238,120

[22] Filed: Feb. 25, 1981

[30] Foreign Application Priority Data

Feb. 29, 1980 [FR] France ................................. 80 04623

[51] Int. Cl.³ ............................................ F16L 55/00
[52] U.S. Cl. ..................................... 285/16; 285/23; 285/275; 411/5
[58] Field of Search ................. 285/272, 275, 277, 16, 285/23; 441/4, 5

[56] References Cited

U.S. PATENT DOCUMENTS 3,434,742  3/1969  Swinney ................................. 285/16

FOREIGN PATENT DOCUMENTS

| 630040 | 10/1961 | Canada ................................. 285/276 |
| 50667 | 2/1961 | France ................................. 285/272 |
| 7232438 | 4/1974 | France . |
| 7239657 | 5/1974 | France . |
| 7628030 | 4/1977 | France . |
| 7633086 | 6/1978 | France . |

Primary Examiner—Dave W. Arola
Attorney, Agent, or Firm—Brisebois & Kruger

[57] ABSTRACT

A hydrocarbon loading buoy has a connection element rotatable in a bearing supported by the buoy. When a riser pipe or conduit is connected to the connection element the pipe and element can rotate or swivel relative to the buoy. A lock mechanism on the buoy is operable to lock the connection element to the buoy so that the connection element is supported independently of the bearing. With the connection element locked the bearing can be serviced, or removed, while the buoy is in operation. In a preferred form, the lock mechanism includes wedges which move radially and engage a sloping surface of the connection element to move it axially into clamping engagement with the buoy.

7 Claims, 2 Drawing Figures

SWIVEL CONNECTOR BETWEEN A FLOATING OR SEMI-SUBMERGED STRUCTURE AND A RISER OR FLOW LINE

DESCRIPTION

The present invention relates to an apparatus for connection between a floating or semi-submerged structure, particularly a hydrocarbon loading or pumping buoy, and a riser pipe or conduit for raising hydrocarbons from the sea floor.

The development of the production of hydrocarbons starting with deposits found under bodies of water, particularly undersea, has led to the development of processes and apparatus permitting the extraction and then the raising to the surface for ultimately loading or distributing the hydrocarbon products.

Applicant's assignee has for example already described in French Pat. Nos. 72.32438, 72.39657, 76.28030, 76.33086 apparatus for collecting hydrocarbon products starting at the sea floor. Such apparatus generally use flexible tubular pipes or conduits having very high resistance to traction and to crushing, and are products of very great length which are made by applicant's assignee.

Certain problems are presented by ascending pipes or "risers", formed particularly advantageously by a flexible tubular pipe which is attached at its lower end to a well head or base on the sea floor, and which at the level of its upper end should be attached to a floating or semi-submerged structure usually constituted of a loading buoy which may be moored to a support ship or a tanker to which can be transferred the hydrocarbons supplied by the riser pipe from the sea floor. In effect, the surface structure or loading buoy will be subjected to displacements because of the wave motion of the water surface and the relative movements of the ships connected to it. The ascending pipe being attached by its lower end, it is necessary to provide a rotatable or swivel connection between the upper end of the pipe and the loading buoy. This rotatable connection is advantageously realized by a roller bearing assembly placed inside the loading buoy to assure relative rotation between the loading structure and the riser pipe or other members fixed to it, the riser pipe being inserted into the interior of the loading buoy through an opening made in the lower portion of the buoy.

During operation, it can become necessary to obtain access to or intervene for maintenance, repair, and replacement of the roller bearing assembly, or at the region or level of the connector which is attached to the upper end of the riser pipe.

The present invention has as a purpose, to provide an apparatus permitting easy accomplishment of such maintenance or intervention operations during the course of the buoy operation, this apparatus being particularly simple and reliable.

The apparatus according to the invention is characterized by the fact that it comprises at least one locking element located inside the loading structure and able to engage a member attached to the riser pipe, the locking element being movable between a first position out of engagement with the member attached to the riser pipe and in which the loading structure is rotatable with respect to the riser piper by means of an assembly of roller bearings and a position of engagement in which the loading structure is fixed to the riser piper and in which the roller bearing assembly no longer provides the connection between the loading structure and the riser pipe.

It will be understood that the use of the locking element or elements for fixing the loading structure and the riser pipe, permits the roller bearing assembly to be "disconnected" or removed, allowing all the necessary interventions inside the loading structure.

Preferably, the locking element or elements are arranged to cause, during their displacement between the disengagement and the engagement positions, a relative vertical movement of the loading structure and the riser pipe.

In one particular embodiment, the or each of the locking elements has a part in the shape of a wedge connected to the shaft or rod of a hydraulic cylinder or screw jack mounted in the loading structure and able to engage in an annular groove having an inclined flank formed in a member fixed to the riser pipe.

In order to make the invention better understood, one embodiment will now be described by way of non-limiting example with reference to the attached drawings in which.

Figure 1:
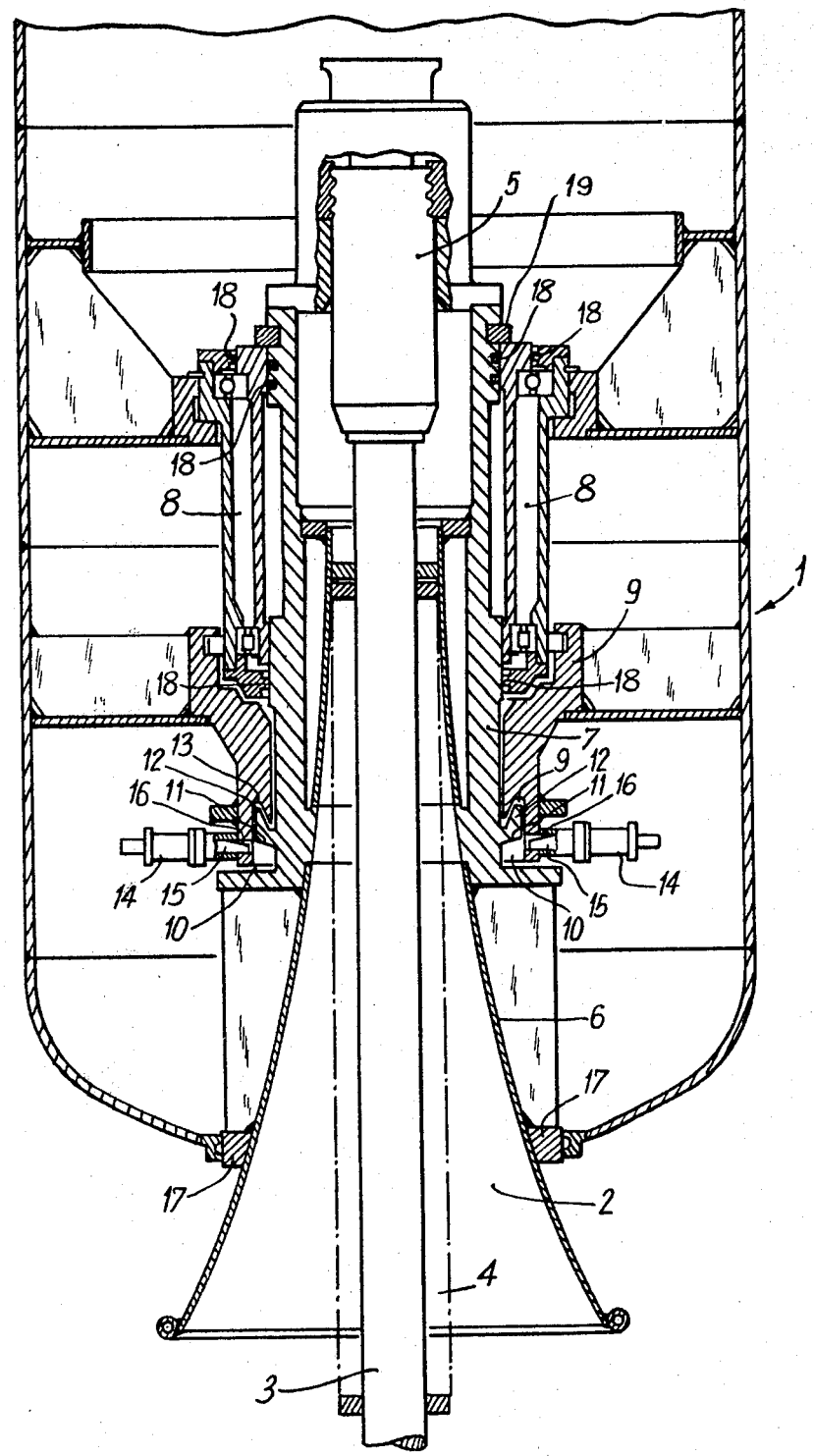
FIG. 1 is a vertical sectional view of the apparatus according to the invention in normal operating position.

The drawings show the lower portion of a semi-submerged structure such as a loading buoy designated overall by 1, which is basically cylindrical in shape, and has at its lower portion an axial opening 2 through which enters the end of a riser pipe 3 furnished with a peripheral sheath 4. Riser pipe 4 has a connector 5 at its upper end.

A trumpet or funnel shaped element 6 is fixed to riser pipe 3, this piece 6 itself being connected to an annular casing 7.

In the normal operating position, shown on FIG. 1, the loading buoy 1 is capable of relative rotation with respect to the assembly comprised of the riser pipe 3 and elements 6 and 7 connected to it by the intermediary of a roller bearing assembly 8 mounted coaxially with respect to the riser pipe 3 near its end having connector 5, this assembly of roller bearings being disposed between casing 7 connected to the riser pipe, and an annular element 9 fixed to the loading buoy 1.

Casing 7 has an annular groove 10 whose upper face 11 is inclined upwardly.

Above this groove 10 casing 7 has a flange 12 having an upwardly inclined upper face. Annular element 9, fixed to loading buoy 1 has an annular groove 13 with an inclined surface, flange 12 having shape corresponding to the shape of groove 13.

The apparatus according to the invention has screw jacks or hydraulic cylinders 14 connected to loading buoy 1 and whose shaft or rod has at its end a piece in the shape of a wedge 15 having an upper inclined surface 16 whose slope corresponds to the slope of face 11 of annular groove 10.

Figure 2:
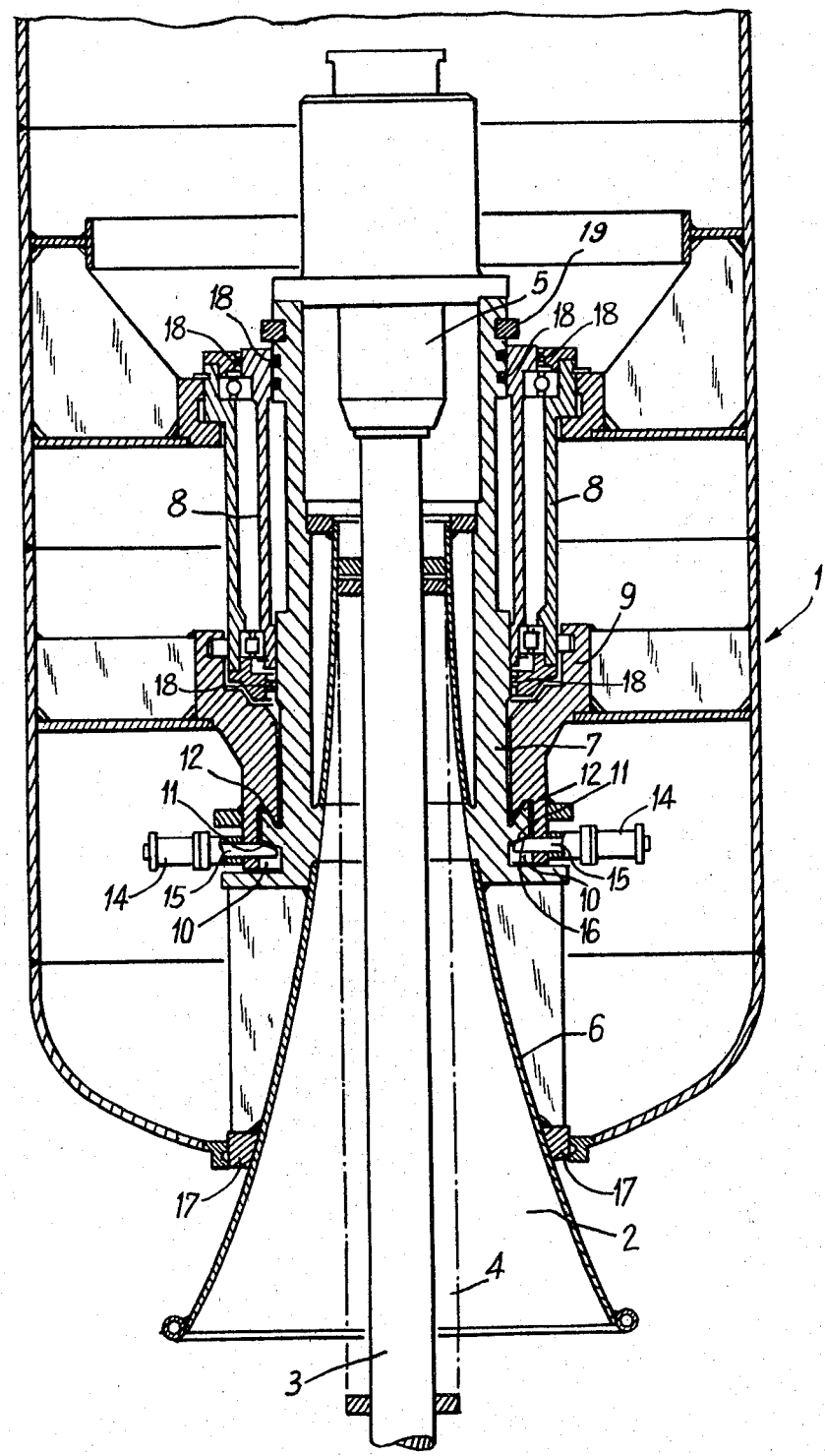
FIG. 2 shows the apparatus of FIG. 1 with the locking elements in their engaged positions.

When, for example, to attain access to the roller bearing assembly 8, screw jacks 14 are operated, the upper faces 16 of wedges 15 engage against the inclined face 11 of groove 10, this causes a slight downward movement of piece 9 and the buoy assembly 1 relative to the riser pipe 3 and annular casing 7, to the full locking position shown on FIG. 2.

Where there is sufficient slack in riser pipe 3, the pipe and annular casing 7 will be lifted relative to the buoy.

In this position the loading buoy 1 is wholly fixed and rigid with the riser pipe or column 3, the roller bearing assembly 8 being in an unloaded or disconnected condition which allows access or intervention at this level, especially repair or replacement as required.

The apparatus according to the invention also includes seals or packing especially at 17 at the level of opening 2 and at 18 at the upper and lower portions of the roller assembly 8 to prevent entry of outside sea water to the inside of the loading buoy, and especially at the level of the roller bearing assembly.

With the wedges 15 extended, as shown at FIG. 2, bearing assembly 8 is unloaded or disconnected and annular casing 7 is rigidly clamped or secured to the buoy. The bearing assembly 8 can then easily be serviced or replaced without danger to personel, and without danger of disconnection of riser pipe 3.

In the embodiment shown, the bearing assembly 8 and annular casing 7 are so constructed, relative to each other, that after support ring 19 is removed from the upper end of casing 7, the entire bearing assembly 8 can be lifted axially for replacement or maintenance operations, such as replacement of rollers or seals. After the bearing assembly is replaced, support ring 19 is installed, and wedges 15 are withdrawn to the FIG. 1 position in which the annular casing 7 to which riser pipe 3 is connected, is again supported on bearing assembly 8, so that the buoy can swivel relative to the riser pipe.

Although the invention has been described in connection with one particular embodiment, it is of course evident that it is in no way thereby limited and that it may undergo numerous variations and modifications without exceeding either its scope or its spirit. In particular, it is clear that although the invention has been described as applied to the connection of a riser pipe for hydrocarbons, to a floating or semi-submerged loading buoy, it is in no way thereby limited and may be used in other applications such as, for example, the connection of a pipe to a floating beacon, torch, or platform.

We claim:

1. A swivel connection arrangement between a structure, floating or partly submerged in a body of water and a flow conduit for hydrocarbons comprising, a structure adapted to be supported in a body of water,
   a connection element including means for fixing the conduit to said element;
   bearing means supported on said structure,
   support means on said connection element for supporting said connection element on said bearing means,
   said bearing means supporting the connection element on the structure for rotation relative to the structure about an axis, whereby said connection element and the conduit connected thereto can normally rotate relative to said structure,
   means for locking said connection element to said structure and moveable between
   a first position in which said bearing means supports said connection element for rotation thereof relative to the structure, and
   a second position in which said connecting element is locked to and supported by said structure independently of said bearing means.

2. A swivel connection arrangement according to claim 1 wherein
   said structure is partly submerged, and
   said swivel connection further comprises seal means for protecting the bearing means from the water in which the structure is submerged.

3. A connection arrangement according to claim 2 wherein
   said locking means comprises means for moving said connection element axially of said bearing means during movement between said first and second positions.

4. A connection arrangement according to claim 3 wherein said connection element comprises an annular flange,
   said structure comprises an annular shoulder axially of said flange, and said locking means, during movement between said first and second positions forces said flange against said shoulder.

5. A connection arrangement according to claim 2 or claim 2 wherein said structure comprises a hydrocarbon loading buoy, and
   said conduit extends vertically upwardly into the buoy.

6. A connection arrangement according to claim 5 wherein
   said bearing means comprises a bearing assembly removable from the connection element upon movement of said locking means to said second position.

7. A connection arrangement according to claim 2 or claim 2 wherein
   said locking means comprises at least one wedge shaped element,
   said connection element comprises an inclined surface in opposed relation to said wedge shaped element, and means for driving said wedge shaped element to said second position into engagement with said inclined surface of the connection element to lock and support the connection element independently of said bearing means.

* * * * *